US009225875B2

(12) United States Patent
Kuroda (10) Patent No.: US 9,225,875 B2
(45) Date of Patent: Dec. 29, 2015

(54) PRINTER SERVER, PRINTER CONTROL METHOD, AND STORAGE MEDIUM THAT STORES A CERTIFICATE GROUP WHICH PERMITS PRINTER CREATION AND PRINTING TO AVOID A RISK OF SPOOFING

(71) Applicant: CANON KABUSHIKI KAISHA, Tokyo (JP)

(72) Inventor: Takashi Kuroda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/509,937

(22) Filed: Oct. 8, 2014

(65) Prior Publication Data
US 2015/0103366 A1 Apr. 16, 2015

(30) Foreign Application Priority Data
Oct. 11, 2013 (JP) ................. 2013-213597

(51) Int. Cl.
*G06F 3/12* (2006.01)
*H04N 1/23* (2006.01)
*H04N 1/00* (2006.01)

(52) U.S. Cl.
CPC ............ *H04N 1/2369* (2013.01); *G06F 3/1212* (2013.01); *G06F 3/1215* (2013.01); *G06F 3/1253* (2013.01); *H04N 2201/0082* (2013.01); *H04N 2201/0091* (2013.01); *H04N 2201/0094* (2013.01)

(58) Field of Classification Search
CPC ....... G06F 3/124; G06F 3/1241; G06F 3/126; G06F 1/3228; G06K 15/16; B41J 3/60
USPC .......... 358/1.1, 1.13, 1.14, 1.15, 1.18; 399/82
See application file for complete search history.

(56) References Cited

U.S. PATENT DOCUMENTS

2007/0223029 A1* 9/2007 Nonaka ........................ 358/1.14
2008/0123139 A1* 5/2008 Harada et al. ................ 358/1.18
2009/0317120 A1* 12/2009 Miyahara ........................ 399/82

FOREIGN PATENT DOCUMENTS

JP 7-037304 A 2/1995

* cited by examiner

*Primary Examiner* — Gabriel Garcia
(74) *Attorney, Agent, or Firm* — Canon USA, Inc. IP Division (57) ABSTRACT

On the basis of the type of a preceding job, it is decided whether or not to continue double-sided circulation between the preceding job and a subsequent job. A printing apparatus executes, based on a type of a first job, a first printing process in which, after an image has been printed on a first side and a second side of a sheet by executing the first job, an image starts to be printed on a sheet by executing a second job to be executed following the first job, and a second printing process in which, after an image has been printed on a first side of a sheet by executing the first job and before an image is printed on a second side of the sheet, an image starts to be printed on a sheet of the second job to be executed following the first job.

6 Claims, 7 Drawing Sheets

PRINTER SERVER, PRINTER CONTROL METHOD, AND STORAGE MEDIUM THAT STORES A CERTIFICATE GROUP WHICH PERMITS PRINTER CREATION AND PRINTING TO AVOID A RISK OF SPOOFING

BACKGROUND OF THE INVENTION

1. Field of the Invention

The present invention relates to a printing apparatus that prints an image on one side or both sides of a sheet, a control method for the printing apparatus, and a storage medium.

2. Description of the Related Art

In the related art, when double-sided printing is performed on recording paper (sheet), a double-sided circulation printing method is known in which, in order to enhance productivity, after image formation has been performed on first sides of several sheets, image formation is performed alternately on first and second sides of sheets (see Japanese Patent Publication No. 07-037304).

In recent years, many of image forming apparatuses, such as color copying machines which have rapidly come into widespread use, include photosensitive members and toner cartridges for four colors of yellow, magenta, cyan, and black.

In such an image forming apparatus, print image data is converted into recording laser beams for four colors, and the photosensitive members for the respective colors are irradiated with the respective recording laser beams to form respective electrostatic latent images thereon. Then, toner development is performed by using toner supplied from each toner cartridge, and primary transfer of visualized images is performed onto an intermediate transfer belt. Hereinafter, a series of processes from conversion of print image data to primary transfer is referred to as an imaging process.

Subsequently, a sheet starts to be fed from a sheet cassette. When the fed sheet reaches a position, which is a secondary transfer position, the toner images are transferred from the intermediate transfer belt onto the sheet. Toner on the sheet is fixed by a fixing unit applying pressure and heat thereto. In the case of double-sided printing, after toner has been fixed on a first side of a sheet, a conveying path is switched, and the sheet is switched back and then conveyed to a double-sided printing sheet conveying path.

Subsequently, as in the first side, an imaging process for a second side is performed, the sheet is re-fed from the double-sided printing sheet conveying path to the secondary transfer position, and secondary transfer and fixing of toner are performed. In the case where double-sided circulation printing is performed, a subsequent job waits to be input until a last sheet of a job reaches the double-sided printing sheet conveying path, thereby enhancing the total productivity of double-sided printing of jobs including the subsequent job.

However, when such double-sided circulation printing across a plurality of jobs is performed, the productivity of double-sided printing of jobs including a subsequent job increases, but completion of printing on a second side of a last sheet of a preceding job will be delayed. On the other hand, when double-sided circulation printing is performed so that it is not performed across a plurality of jobs, if a large number of double-sided print jobs in each of which a small number of pages are to be printed are input, the productivity of printing decreases significantly.

SUMMARY OF THE INVENTION

An image forming apparatus according to the present invention includes: a printing unit configured to execute a first printing process in which, after an image has been printed on a first side and a second side of a sheet by executing a first job, an image starts to be printed on a sheet by executing a second job to be executed following the first job, and a second printing process in which, after an image has been printed on a first side of a sheet by executing the first job and before an image is printed on a second side of the sheet, an image starts to be printed on a sheet of the second job to be executed following the first job; and a control unit configured to decide, based on a type of the first job, whether to cause the printing unit to execute the first printing process or to cause the printing unit to execute the second printing process.

Further features of the present invention will become apparent from the following description of exemplary embodiments with reference to the attached drawings.

DESCRIPTION OF THE EMBODIMENTS

Exemplary embodiments for implementing the present invention will be described below with reference to the drawings.

Description of System Configuration

First Embodiment

Figure 1:
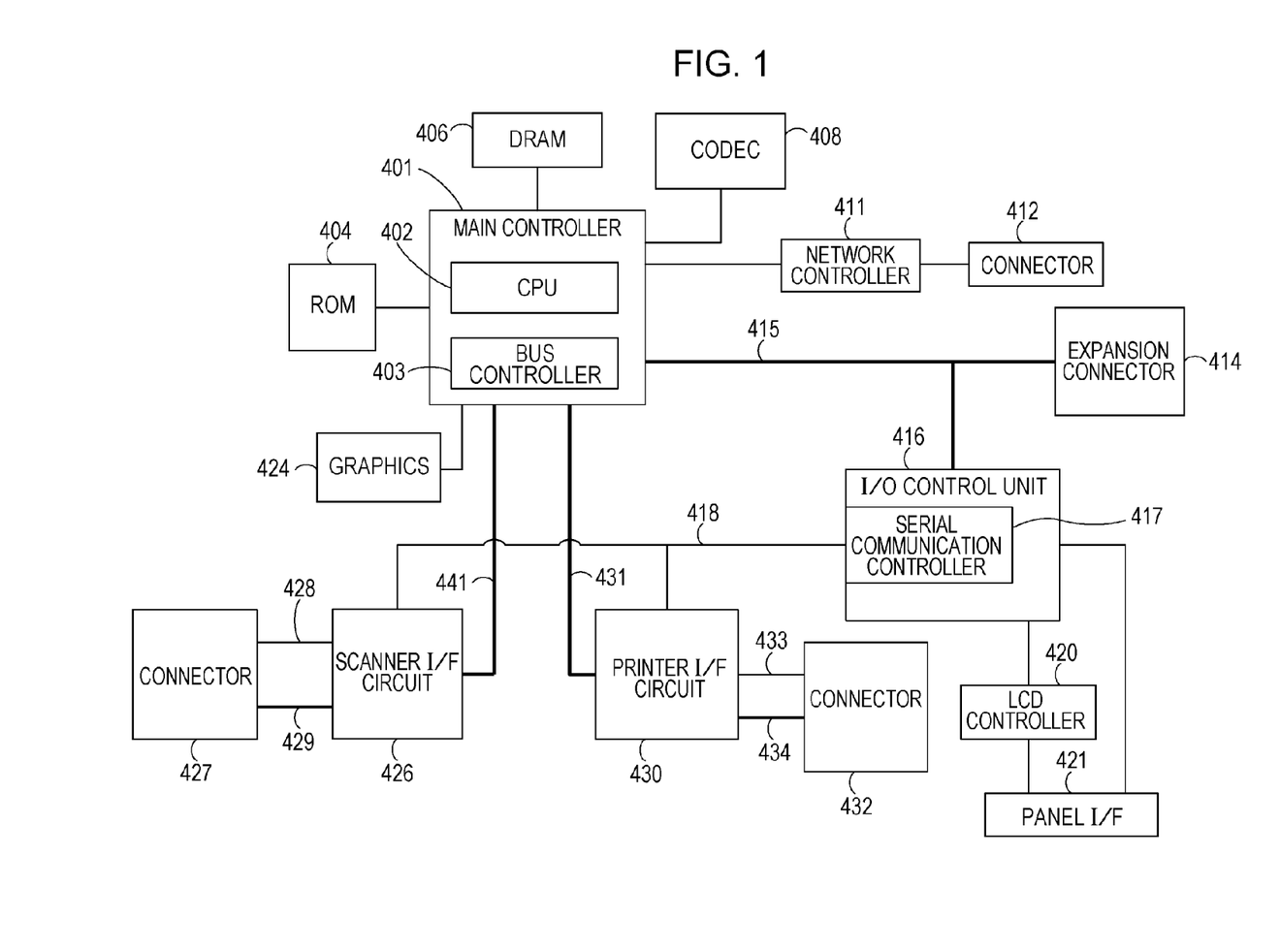
FIG. 1 is a block diagram illustrating a control configuration of an image forming apparatus.

FIG. 1 is a block diagram illustrating a control configuration of an image forming apparatus according to a first embodiment. A hardware configuration of a controller which controls a scanner, a printer, and a network interface unit that are included in the image forming apparatus will be described in detail below.

In FIG. 1, a main controller 401 primarily includes a central processing unit (CPU) 402, a bus controller 403, and various interface (I/F) controller circuits. The CPU 402 and the bus controller 403 control operations performed by the entire apparatus, and the CPU 402 performs image formation control on the basis of a program read in from a read only memory (ROM) 404.

In this program, there is also written an operation in which page description language (PDL) code data received from a device driver (printer driver) of an external information processing device (personal computer (PC)) via a network is interpreted and rasterized into raster image data (imaged). The CPU 402 executes the program, and thus processes based on pieces of software corresponding to various applications are implemented by using hardware resources.

The bus controller 403 is a unit that controls transfer of data input/output from each I/F, and performs bus arbitration or controls direct memory access (DMA) data transfer. A dynamic random access memory (DRAM) 406 is connected to the main controller 401, and is used as a work area in which the CPU 402 operates or an area in which image data is accumulated.

A compressor/decompressor (CODEC) 408 compresses raster image data accumulated in the DRAM 406 with, for example, a modified Huffman (MH), modified relative element address designate (MR), modified modified relative element address designate (MMR), Joint Bi-level Image experts Group (JBIG), or Joint Photographic Experts Group (JPEG) method, and conversely decompresses compressed and accumulated code data into raster image data. The CODEC 408 is connected to the main controller 401 via an I/F, which is not illustrated, and data transfer between the CODEC 408 and the DRAM 406 is controlled by the bus controller 403 and is performed by using a DMA technique.

A graphics processor (GRAPHICS) 424 performs image rotation, image scaling, color space transformation, and binarization processes on raster image data accumulated in the DRAM 406. The graphics processor 424 is connected to the main controller 401 via an I/F, which is not illustrated, and data transfer between the graphics processor 424 and the DRAM 406 is controlled by the bus controller 403 and is performed by using the DMA technique.

A network controller 411 is connected to the main controller 401 via an I/F, which is not illustrated, and is connected to an external network via a connector 412. A typical network here is an Ethernet (registered trademark) network.

An expansion connector 414 used for connection of an expansion board, and an input/output (I/O) control unit 416 are connected to a general-purpose high-speed bus 415. A typical general-purpose high-speed bus is a peripheral component interconnect (PCI) bus. The I/O control unit 416 includes an asynchronous serial communication controller 417 having two channels used for transmitting/receiving a control command to/from CPUs of the scanner and the printer. The I/O control unit 416 is connected to a scanner I/F circuit 426 and a printer I/F circuit 430 via an I/O bus 418.

A panel I/F 421 is connected to a liquid crystal display (LCD) controller 420, and includes an I/F used for providing a display on a liquid crystal screen on an operation unit, and a key input I/F used for providing inputs via hardware keys and touch panel keys. A connector 427 and a connector 432 are respectively connected to the scanner and the printer, and include asynchronous serial I/Fs 428 and 433, and video I/Fs 429 and 434.

Figure 2:
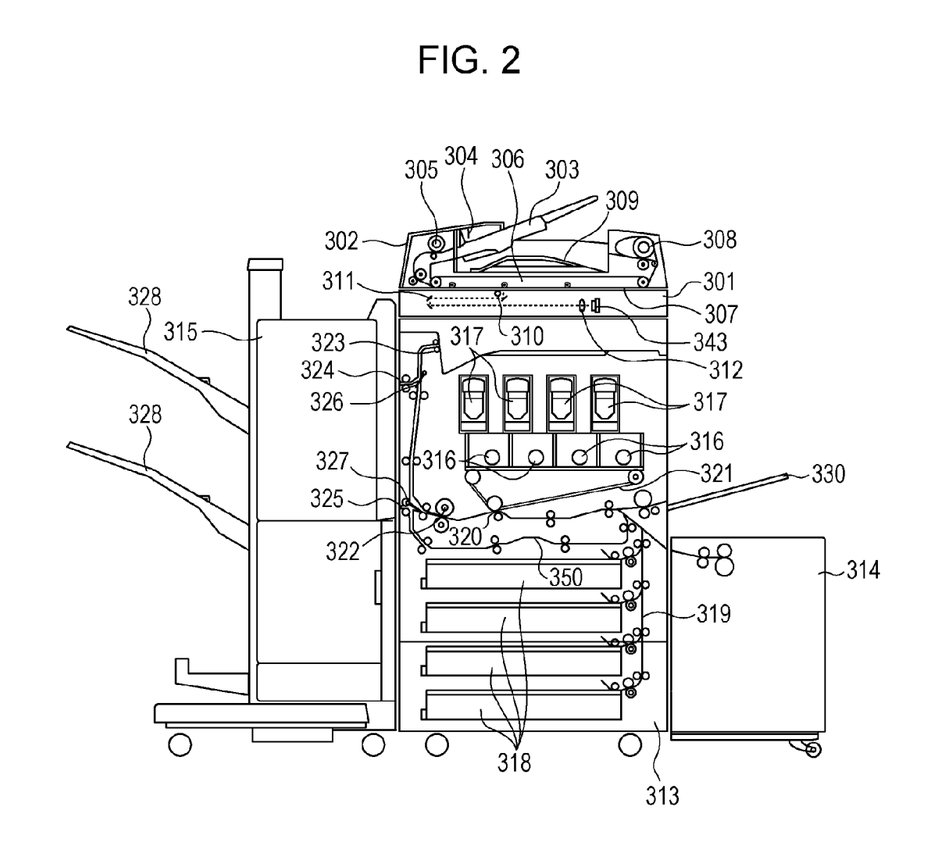
FIG. 2 is a cross-sectional view illustrating an example of the configuration of the image forming apparatus illustrated in FIG. 1.

The scanner I/F circuit 426 is connected to a scanner 301 illustrated in FIG. 2 via the connector 427 and also connected to the main controller 401 via a scanner bus 441. The scanner I/F circuit 426 has a function of performing a certain process on an image received from the scanner 301. In addition, the scanner I/F circuit 426 has a function of outputting, to the scanner bus 441, a control signal generated on the basis of a video control signal transmitted from the scanner 301. Data transfer from the scanner bus 441 to the DRAM 406 is controlled by the bus controller 403.

The printer I/F circuit 430 is connected to a printer 313 illustrated in FIG. 2 via the connector 432 and also connected to the main controller 401 via a printer bus 431. The printer I/F circuit 430 has a function of performing a certain process on image data output from the main controller 401 and outputting it to the printer 313. In addition, the printer I/F circuit 430 has a function of outputting, to the printer bus 431, a control signal generated on the basis of a video control signal transmitted from the printer 313.

Transfer of raster image data rasterized on the DRAM 406 to the printer 313 is controlled by the bus controller 403 and is performed by using the DMA technique via the printer bus 431 and the video I/F 434. An example in which the controller of the image forming apparatus is constituted by the above-mentioned hardware resources has been described; alternatively, an image forming apparatus to which another device, for example, a sheet processing device or the like illustrated in FIG. 2 is connected may be employed.

FIG. 2 is a cross-sectional view illustrating an example of the configuration of the image forming apparatus illustrated in FIG. 1. In this embodiment, an example of a multifunction peripheral (MFP) having functions of a copying machine, a printer, and a facsimile is described.

In FIG. 2, the MFP includes the scanner 301, a document feeder (DF) 302, the printer 313 for print recording having four color drums, a sheet feed deck 314, and a finisher 315.

First, a scanning operation mainly performed by the scanner 301 will be described. The DF 302 is provided so as to be rotatable in a direction perpendicular to a platen glass of a main body, which is not illustrated, and is capable of functioning as a pressing plate.

In the case where a document is set on a document positioning plate and read in, the document is set on a document positioning plate 307, and the DF 302 is closed. Then, after an open/close sensor detects that the document positioning plate 307 has been covered, a reflection-type document size detection sensor provided in an enclosure of the scanner 301 detects the size of the set document. Upon the detection of the size, the document is irradiated with light from a light source 310, and an image is scanned by a charge coupled device (CCD) 343 via a scanning reflector 311 and a lens 312. Then, the image is converted into a digital signal, subjected to intended image processing, and converted into a laser recording signal. The converted recording signal is stored in the memory included in the controller described with reference to FIG. 1.

In the case where a document is set on the DF 302 so as to be automatically conveyed and an image of the document is read in, the document is placed face up on a tray of a document setting unit 303 of the DF 302. Then, a document presence sensor 304 detects that the document has been set. In response to the detection, a sheet feed roller 305 and a conveying belt 306 rotate to convey the document, and the document is set in a certain position on the document positioning plate 307. Thereafter, as in the reading performed on the document positioning plate 307, the image is read in, and stored in the memory included in the controller.

After completion of the reading, the conveying belt 306 rotates again to convey the document to the right side in FIG. 2, and discharges the document onto a document discharge tray 309 via a conveying roller 308 provided on a discharge side. In the case where there are a plurality of documents, a document is conveyed to be discharged from the document positioning plate 307 to the right side in FIG. 2, and simultaneously, a subsequent document is fed from the left side via the sheet feed roller 305 and continuously read in. The above is an operation performed by the scanner 301. Next, a printing operation mainly performed by the printer 313 will be described.

A recording signal (print image data) temporarily stored in the memory included in the controller described with reference to FIG. 1 is transferred to the printer 313, and converted into recording laser beams for four colors of yellow, magenta, cyan, and black in a laser recording unit.

Then, photosensitive members 316 for the respective colors are irradiated with the respective recording laser beams to form respective electrostatic latent images thereon. Then, toner development is performed by using toner supplied from each of toner cartridges 317, and primary transfer of visualized images is performed onto an intermediate transfer belt 321.

Subsequently, the intermediate transfer belt 321 rotates clockwise. When a sheet fed from a sheet cassette 318 or the sheet feed deck 314 through a fed sheet conveying path 319 reaches a position 320, which is a secondary transfer position, the images are transferred from the intermediate transfer belt 321 onto the sheet.

Toner on the sheet onto which the images have been transferred is fixed by a fixing unit 322 applying pressure and heat thereto. Subsequently, the sheet is conveyed through a discharge conveying path, and then discharged to a face-down center tray 323, or switched back and discharged to a discharge port 324 to the finisher 315, or discharged to a face-up side tray 325. The side tray 325 is a discharge port that enables a sheet to be discharged only in the case where the finisher 315 is not attached.

Flappers 326 and 327 are used to switch between conveying paths so as to switch between the discharge ports. In the case of double-sided printing, after the sheet passes through the fixing unit 322, the flapper 327 switches between the conveying paths. Then, the sheet is switched back and conveyed downward, and fed again to the position 320 through a double-sided printing sheet conveying path 350. Thus, a double-sided operation is implemented.

Double-sided circulation control is performed by using components in a conveyance path including the double-sided printing sheet conveying path 350, the position 320, and the fixing unit 322. Five-sheet circulation control is performed for A4- or letter (LTR)-size sheets, and three-sheet circulation control is performed for sheets larger than the A4- or LTR-size sheets. Next, an operation performed by the finisher 315 will be described.

The finisher 315 performs post-processing on a printed sheet in accordance with a function specified by a user. Specifically, the finisher 315 has functions, such as stapling (one- or two-position binding), punching (two or three holes), and saddle stitch binding. A reference numeral 330 denotes a manual feed tray which is used to feed a standard-size sheet or specific-size sheet. In addition, the manual feed tray 330 may be used to feed thick paper.

The MFP illustrated in FIG. 2 has two discharge trays 328. Sheets having passed through the discharge port 324 to the finisher 315 are sorted into the discharge trays 328, for example, for each of functions of copying, printing and faxing, in accordance with user's settings.

Figure 3:
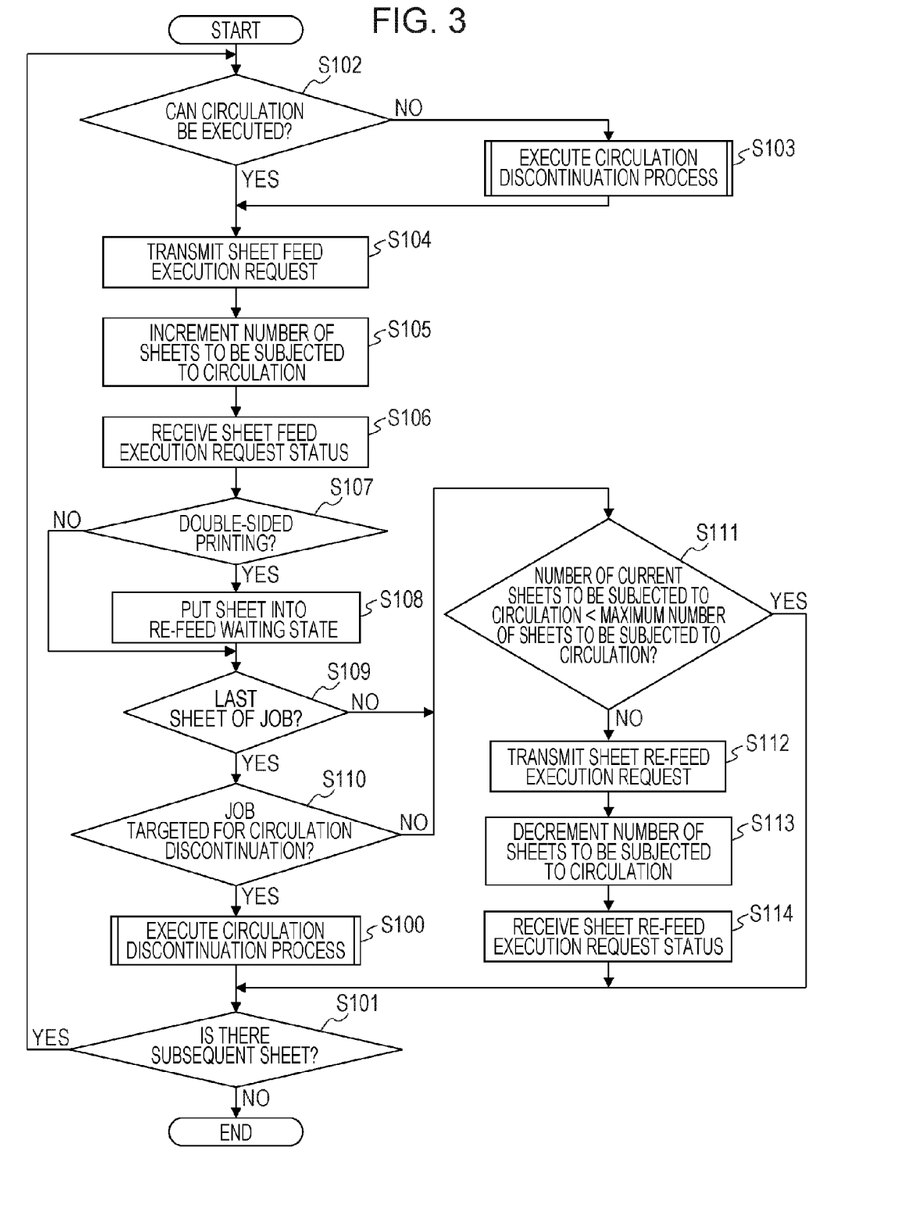
FIG. 3 is a flowchart illustrating a control method for the image forming apparatus.

FIG. 3 is a flowchart illustrating a control method for the image forming apparatus according to this embodiment. In this embodiment, an example of a sheet feed request process executed when print image data and print setting data for a subsequent sheet are prepared in the DRAM 406 illustrated in FIG. 1 is described. Each step is implemented by causing the CPU 402 illustrated in FIG. 1 to execute a control program based on the flowchart by using the hardware resources illustrated in FIG. 1. For convenience of explanation, the process starts at S102; however, the fact remains that S102 is a process following a determination process in S101 to be described later. An example where the CPU 402 determines the type of a job and performs control so that either a first double-sided printing process or second double-sided printing process to be executed by the printer 313 is executed will be described in detail below.

In S102, the CPU 402 acquires print setting data for a sheet stored in the DRAM 406, and compares setting values of double- or single-sided, sheet size, and sheet orientation that are contained in the print setting data with setting values for an immediately previously fed sheet.

Then, as a comparison result provided by the CPU 402, if there is a difference between the setting values, it is determined that double-sided circulation cannot be continued. In this case, before a new sheet is fed, in order to discharge all sheets existing on a conveyance path outside the apparatus, a double-sided circulation discontinuation process is executed (S103), and the process flow proceeds to S104.

On the other hand, when the CPU 402 determines that double-sided circulation can be executed in S102, the CPU 402 transmits a sheet feed execution request to the printer 313, and notifies the printer 313 of parameters for a sheet to be subsequently fed in S104. Then, the CPU 402 increments the number of sheets to be subjected to double-sided circulation held in its own memory (S105). Subsequently, the printer 313 receives the sheet feed execution request, and when the CPU 402 determines that the subsequent sheet can be fed, the CPU 402 requests the printer 313 to transmit a sheet feed execution request status, and receives the sheet feed execution request status from the printer 313 (S106).

Then, it is determined whether or not the sheet feed execution request status indicates that a double- or single-sided setting of the sheet is "double-sided" (S107). Here, when the CPU 402 determines that the sheet feed execution request status indicates "double-sided" (S107), the CPU 402 registers the sheet in a re-feed waiting sheet queue held in its own memory, that is, puts the sheet into a re-feed waiting state (S108). When the CPU 402 determines that the sheet feed execution request status does not indicate "double-sided" (S107), the CPU 402 proceeds to S109.

In the image forming apparatus, as job types involving a printing process, there are copying, PDL printing, FAX reception printing, and the like. If a job type is "copying", a document scanning operation performed by the scanner 301 is involved, and thus it is assumed that the user is in the immediate vicinity of the image forming apparatus.

In this way, in the case where the user is in the immediate vicinity of the image forming apparatus, if completion of printing on a last sheet of a job being executed by the user is delayed, the user will be kept waiting there, thereby diminishing user convenience.

For this reason, the CPU 402 determines whether or not the sheet is a last sheet of a job being executed (S109). Here, when the CPU 402 determines that the sheet is a last sheet of a job being executed, the CPU 402 further determines whether or not its job type is "copying", which is a job targeted for circulation discontinuation, (S110). Here, when the CPU 402 determines that the job type is "copying", a circulation discontinuation process is executed (S100), because double-sided circulation across jobs is not performed even if a subsequent job exists.

On the other hand, when the CPU 402 determines that the job type being executed is not "copying" in S110, in order to enhance the total productivity of printing of a plurality of jobs, control is performed so that double-sided circulation printing across the jobs including a subsequent job is executed.

Thus, in the case where a plurality of consecutive copy jobs are being executed by the same user, this has the effect of keeping the user in the immediate vicinity of the image forming apparatus waiting as little as possible.

On the other hand, when the CPU 402 determines that the job type is not "copying" in S110, the CPU 402 proceeds to S111. Double-sided circulation is continued between the consecutive jobs input by the same user, and the double-sided circulation is discontinued at a last sheet of a last job input by the user. In double-sided circulation printing, the number of sheets that can be consecutively fed onto the conveyance path so as to form an image on their first sides depends on a conveyance path length, a sheet size, and sheet orientation. The number is referred to as the maximum number of sheets to be subjected to circulation.

Subsequently, the CPU 402 determines whether or not the number of sheets to be subjected to double-sided circulation held in the memory is smaller than the maximum number of sheets to be subjected to circulation (S111). Here, when the CPU 402 determines that the number of sheets to be subjected to double-sided circulation is smaller than the maximum number of sheets to be subjected to circulation, the CPU 402 proceeds to S101 because a sheet can still be fed onto the conveyance path. Then, the CPU 402 determines whether or not print image data for a subsequent sheet has been stored in the DRAM 406 (whether or not there is a sheet to be subsequently fed) (S101).

On the other hand, when the CPU 402 determines that the number of sheets to be subjected to double-sided circulation has reached the maximum number of sheets to be subjected to circulation in S111, the CPU 402 transmits a sheet re-feed execution request for a first sheet registered in the re-feed waiting sheet queue to the printer 313 (S112). Then, the CPU 402 decrements the number of sheets to be subjected to double-sided circulation held in the memory (S113).

When the printer 313 receives the sheet re-feed execution request, the printer 313 notifies the CPU 402 of a sheet re-feed execution request status, acquires image data from the main controller 401 via the printer I/F circuit 430, and performs an imaging process for a second side. After the imaging process for the second side has been completed and the sheet has reached the double-sided printing sheet conveying path 350, the printer 313 executes sheet re-feeding and performs secondary transfer onto the second side of the sheet. In this case, because the number of sheets to be subjected to double-sided circulation has reached the maximum number of sheets to be subjected to circulation, the sheet has already reached the double-sided printing sheet conveying path 350, and thus sheet re-feeding is executed immediately after the imaging process for the second side has been completed.

Subsequently, when the CPU 402 receives the sheet re-feed execution request status from the printer 313 (S114), the CPU 402 proceeds to S101, and determines whether or not print image data for a subsequent sheet has been stored in the DRAM 406. In this way, the printer 313 begins to prepare for subsequent sheet feeding.

Thus, when double-sided printing of a subsequent job is performed following a preceding job, a time period that elapses before the double-sided printing of the subsequent job is completed may be reduced.

Figure 4:
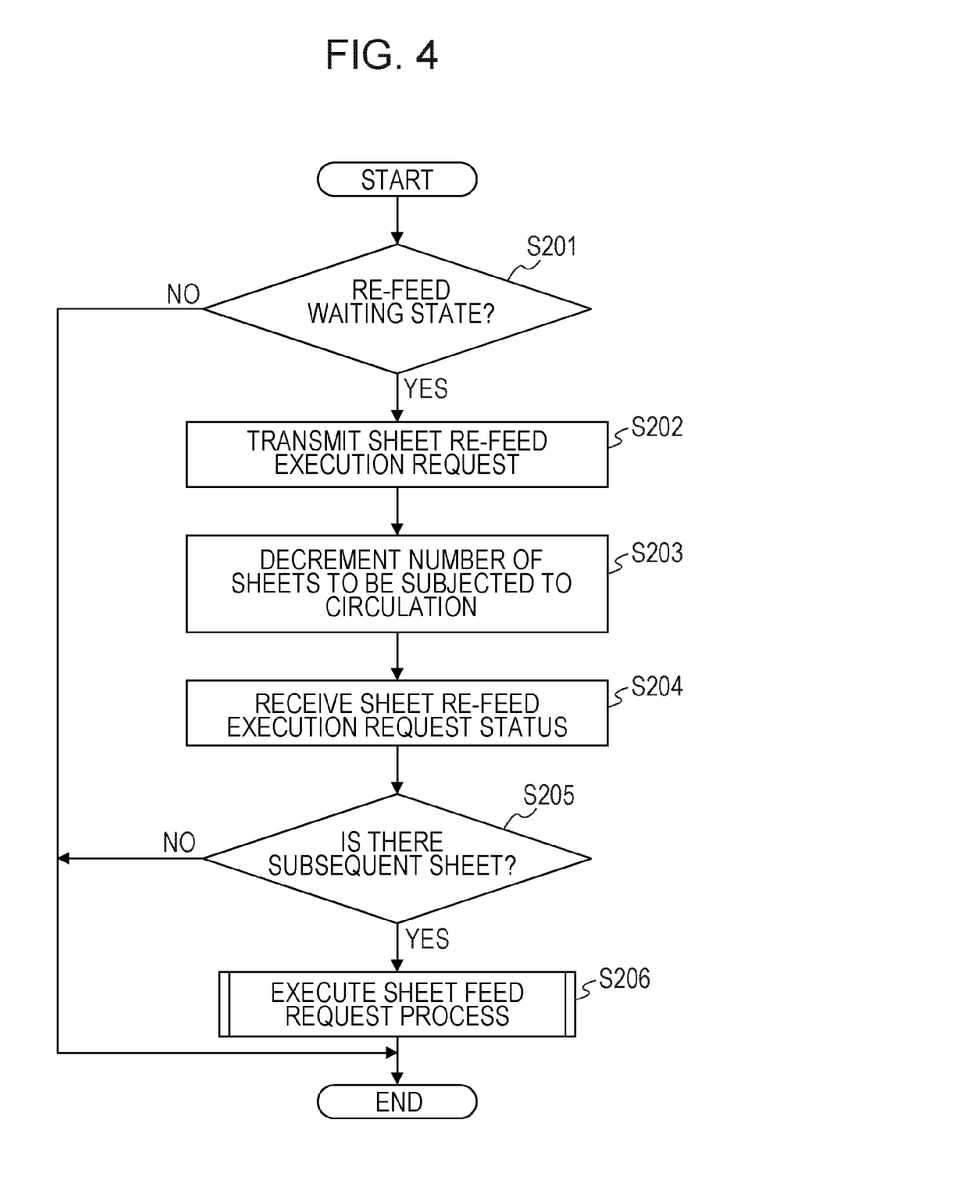
FIG. 4 is a flowchart illustrating a control method for the image forming apparatus.

FIG. 4 is a flowchart illustrating a control method for the image forming apparatus according to this embodiment. In this embodiment, an example of a page completion reception process executed when a page completion status notification is received from the printer 313 is described. Each step is implemented by causing the CPU 402 illustrated in FIG. 1 to execute a control program based on the flowchart by using the hardware resources illustrated in FIG. 1.

When the printer 313 completes an image forming process on a side of a sheet, the printer 313 notifies the CPU 402 of a page completion status. The printer 313 notifies the CPU 402 of a page completion status of a first side of a double-sided printing sheet at a point in time when the sheet reaches the double-sided printing sheet conveying path 350. In addition, the printer 313 notifies the CPU 402 of page completion statuses of a first side of a single-sided printing sheet and a second side of the double-sided printing sheet at a point in time when each sheet reaches the discharge conveying path.

First, the CPU 402 identifies a sheet from a page number parameter of the received page completion status, and determines whether or not the sheet is in a re-feed waiting state, that is, whether or not the sheet has been registered in the re-feed waiting sheet queue (S201). Here, when the CPU 402 determines that the sheet is in a re-feed waiting state, the CPU 402 transmits a sheet re-feed execution request to the printer 313 (S202), and decrements the number of sheets to be subjected to double-sided circulation held in the memory (S203).

Then, the CPU 402 receives a sheet re-feed execution request status transmitted from the printer 313 (S204). Subsequently, the CPU 402 determines whether or not print image data for a subsequent sheet has been stored in the DRAM 406 (S205). Here, when it is determined that print image data for a subsequent sheet has not been stored in the DRAM 406, the present process is ended. On the other hand, when it is determined that print image data for a subsequent sheet has been stored in the DRAM 406, the sheet feed request process illustrated in FIG. 3 is executed (S206), and the present process is ended.

Figure 5:
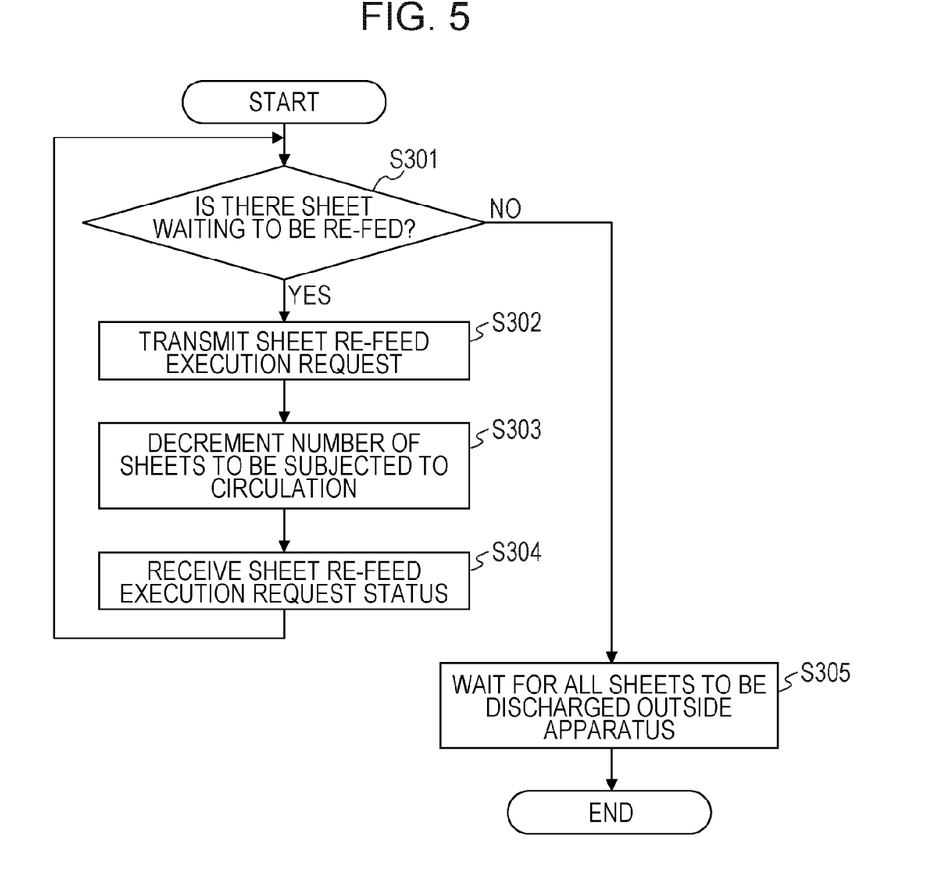
FIG. 5 is a flowchart illustrating a control method for the image forming apparatus.

FIG. 5 is a flowchart illustrating a control method for the image forming apparatus according to this embodiment. In this embodiment, an example of a double-sided circulation discontinuation process executed when double-sided circulation is not continued is described.

This control method is implemented by causing the CPU 402 to execute a control program based on the flowchart. Each step is implemented by causing the CPU 402 illustrated in FIG. 1 to execute a control program based on the flowchart by using the hardware resources illustrated in FIG. 1.

First, in the case where double-sided circulation is not continued, because a new sheet is fed after all sheets existing on the conveyance path have been discharged outside the apparatus, the CPU 402 determines whether or not there is a sheet waiting to be re-fed (S301).

Subsequently, the CPU 402 transmits a sheet re-feed execution request to the printer 313 in S302. Then, the CPU 402 decrements the number of sheets to be subjected to double-sided circulation in S303, receives a sheet re-feed execution request status from the printer 313 in S304, and returns to S301.

On the other hand, when the CPU 402 determines that there is no sheet waiting to be re-fed in S301, after the CPU 402 is notified, from the printer 313, of page completion statuses indicating that all respective sheets have been discharged outside the apparatus (S305), the present process is ended.

Figure 6A:
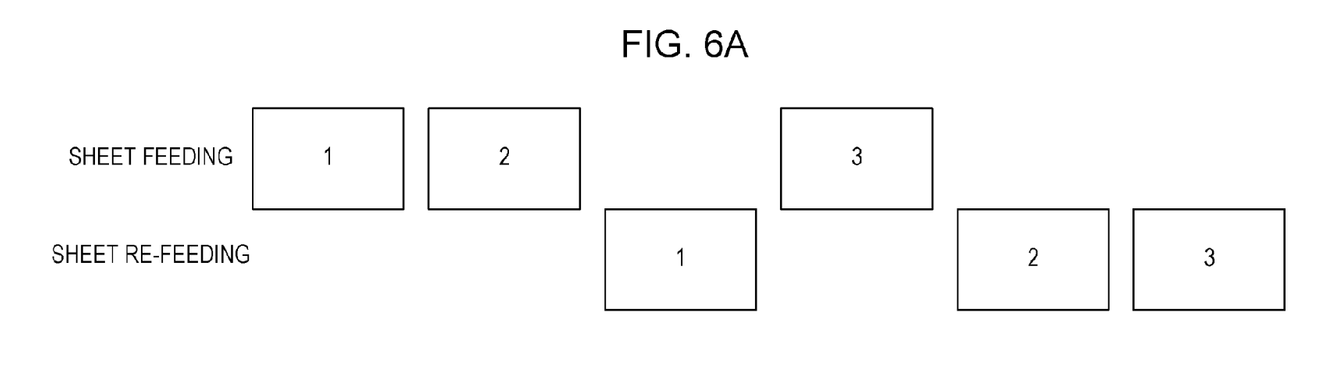
FIGS. 6A and 6B are each a schematic diagram illustrating the order in which sheets are fed during circulation image formation.
Figure 6B:
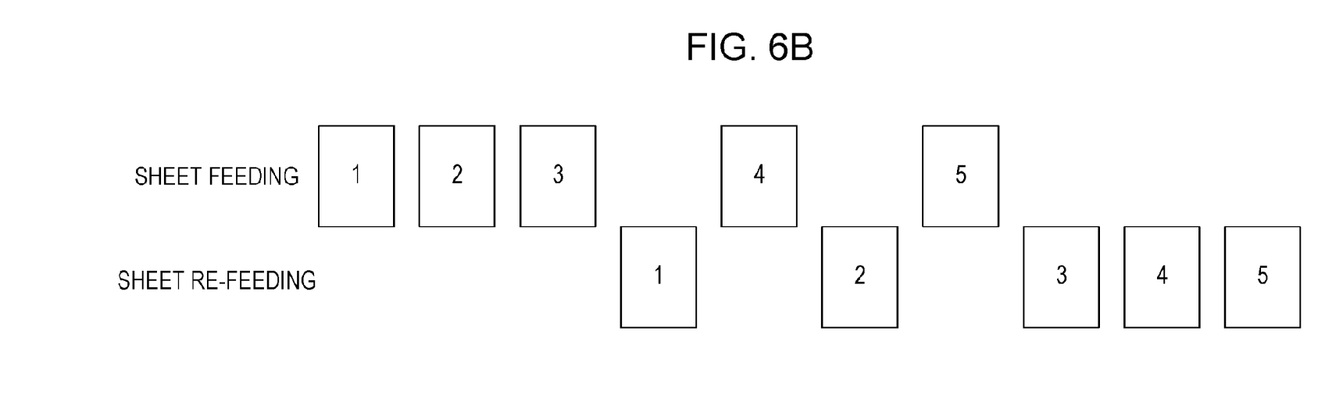

FIGS. 6A and 6B are each a schematic diagram illustrating the order in which sheets are fed during circulation image formation in the image forming apparatus according to this embodiment. An example of control performed so as to execute a first double-sided printing process and a second double-sided printing process will be described below. The first double-sided printing process is a process in which printing is performed consecutively on first sides of sheets and also printing is performed alternately on a second side and a first side. The second double-sided printing process is a process in which printing is performed alternately on a first side and a second side.

FIG. 6A illustrates the order in which sheets are fed in the case of three-sheet circulation, and FIG. 6B illustrates the order in which sheets are fed in the case of five-sheet circulation. In addition, in FIGS. 6A and 6B, numbers 1 to 5 written on sheets each denote what number sheet a sheet is.

As illustrated in FIG. 6A, in double-sided image formation, in the case where three-sheet circulation image formation is performed, a first sheet is fed for its front side, and the first sheet is not then re-fed for its back side, but control is performed so that a second sheet is fed for its front side. Then, the previously fed first sheet is re-fed for its back side, a third sheet is then fed for its front side, and thus control is performed so that sheet re-feeding for a back side and sheet feeding for a front side are alternately performed.

On the other hand, as illustrated in FIG. 6B, in double-sided image formation, in the case where five-sheet circulation image formation is performed, a first sheet is fed for its front side, and the first sheet is not then re-fed for its back side, but control is performed so that a second sheet is fed for its front side. Furthermore, unlike in three-sheet circulation, the first sheet is not then re-fed for its back side, but a third sheet is fed for its front side. Then, the previously fed first sheet is re-fed for its back side, a fourth sheet is then fed for its front side, and thus control is performed so that sheet re-feeding for a back side and sheet feeding for a front side are alternately performed.

In this way, the reason that the number of sheets to be subjected to circulation is changed to three or five is to efficiently perform double-sided image formation for a different-size sheet on the same sheet path.

Figure 7A:
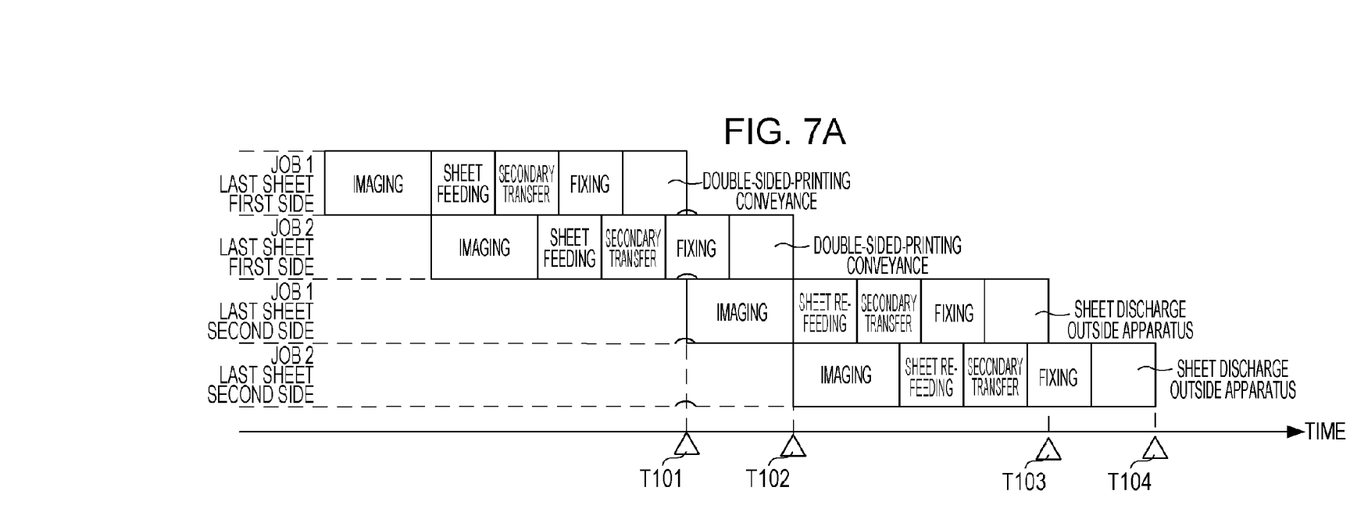
FIGS. 7A and 7B illustrate image forming process timings.
Figure 7B:
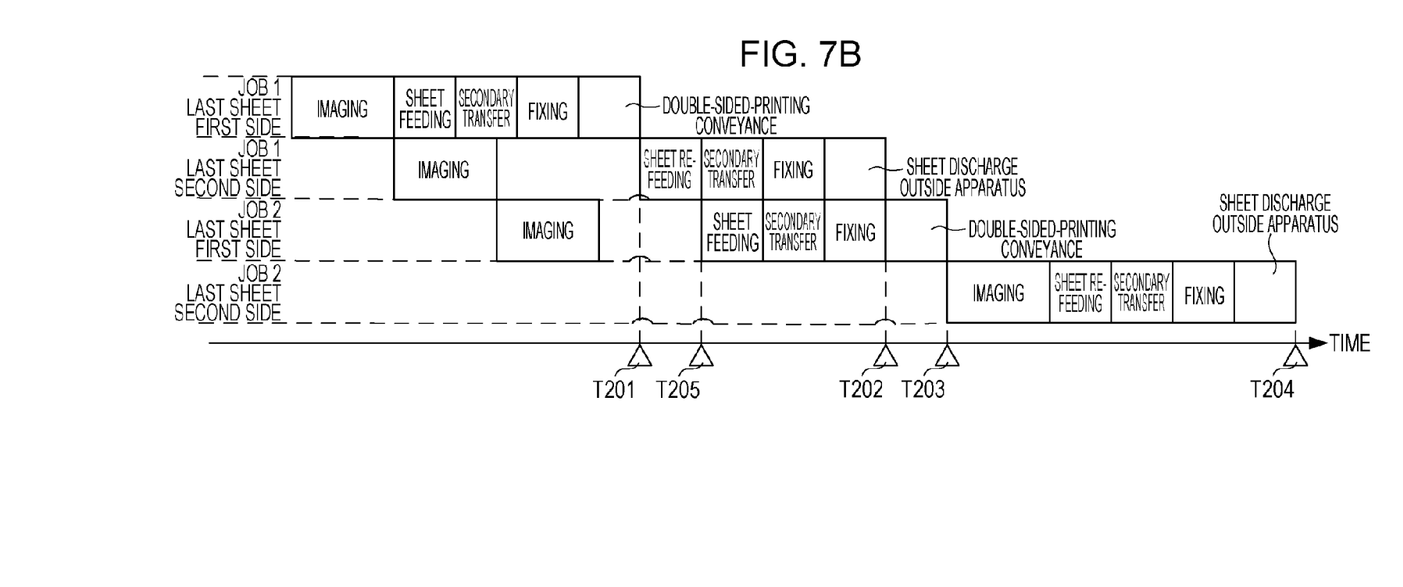

FIGS. 7A and 7B illustrate image forming process timings in the image forming apparatus according to this embodiment. The effect of the present invention will be described below taking, as an example, two double-sided one-sheet print jobs with reference to FIGS. 7A and 7B.

In FIGS. 7A and 7B, a job 1 denotes a copy job, and a job 2 denotes a PDL print job. It is assumed that preparation of print image data of the job 2 is complete while an image forming process is being performed on a first side of a last sheet of the job 1. Furthermore, from the point of view of the configuration of the apparatus, processes of imaging, sheet feeding (or sheet re-feeding), secondary transfer, fixing, and double-sided-printing conveyance (or sheet discharge outside the apparatus) are not executed in parallel with the same respective processes as themselves.

For example, in FIG. 7A, while an imaging process for the first side of the last sheet of the job 1 is being performed, an imaging process for a first side of a last sheet of the job 2 cannot be performed. In addition, in FIG. 7B, while a sheet re-feeding process for a second side of the last sheet of the job 1 is being performed, a sheet feeding process for the first side of the last sheet of the job 2 cannot be performed.

FIG. 7A illustrates a control method according to the related art, that is, a method in which a double-sided circulation printing process is continuously performed between the job 1 and the job 2. In FIG. 7A, an image forming process is performed on each side in the order of the first side of the last sheet of the job 1, the first side of the last sheet of the job 2, the second side of the last sheet of the job 1, and a second side of the last sheet of the job 2.

Because the number of sheets to be subjected to double-sided circulation has not yet reached the maximum number of sheets to be subjected to circulation, an imaging process for the second side of the last sheet of the job 1 waits to be started until completion of double-sided-printing conveyance for the first side of the last sheet of the job 1, that is, until the last sheet of the job 1 reaches the double-sided printing sheet conveying path 350 (T101). Similarly, an imaging process for the second side of the last sheet of the job 2 is started after completion of double-sided-printing conveyance for the first side of the last sheet of the job 2 (T102). T103 and T104 denote respective times at which the last sheets of the job 1 and the job 2 are discharged outside the apparatus.

FIG. 7B illustrates a control method according to the present invention, that is, a method in which a double-sided circulation printing process is not continued between the job 1 and the job 2. In FIG. 7B, because the preceding job 1 is a copy job, double-sided circulation is not continued for the job 2, which is a subsequent job.

Thus, an image forming process is performed on each side in the order of the first side of the last sheet of the job 1, the second side of the last sheet of the job 1, the first side of the last sheet of the job 2, and the second side of the last sheet of the job 2.

As for the second side of the last sheet of the job 1, although an imaging process is executed immediately after completion of an imaging process for the first side of the last sheet of the job 1, as a matter of course, a sheet re-feeding process cannot be performed until the last sheet of the job 1 reaches the double-sided printing sheet conveying path 350 (T201). As a result, a time of completion of discharge of the last sheet of the job 1 outside the apparatus (T202) is earlier than the end time T103 of the job 1 in FIG. 7A by an imaging process time period.

Although an imaging process for the first side of the last sheet of the job 2 is executed immediately after completion of the imaging process for the second side of the last sheet of the job 1, as described above, because a sheet feeding process and a sheet re-feeding process cannot be executed in parallel with each other, sheet feeding for the first side of the last sheet of the job 2 is started at T205. In addition, because the job 2 is a PDL print job, in order to continue double-sided circulation as long as possible, an imaging process for the second side is started after completion of double-sided-printing conveyance for the first side of the last sheet (T203). As a result, a time of completion of discharge of the last sheet of the job 2 outside the apparatus is T204.

According to this embodiment, even in the case where double-sided printing of another type job is executed following a preceding specific-type job, a time period that elapses before the double-sided printing of the subsequent job is completed may be reduced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-213597 filed Oct. 11, 2013, which is hereby incorporated by reference herein in its entirety.

What is claimed is:

1. A printing apparatus comprising:

a printing unit configured to execute a first printing process in which, after a first image has been printed on a first side of a sheet and a second image has been printed on a second side of the sheet by executing a first job, a third image is printed on another sheet by executing a second job to be executed following the first job, and a second printing process in which, after the first image has been printed on the first side of the a sheet by executing the first job and before the second image is printed on the second side of the a sheet by executing the first job, the third image is printed on the another sheet by executing the second job to be executed following the first job; and a control unit configured to decide, based on a type of the first job, whether to cause the printing unit to execute the first printing process or to cause the printing unit to execute the second printing process.

2. The printing apparatus according to claim 1, wherein if the type of the first job is a copy job, the control unit causes the printing unit to execute the first printing process.

3. The printing apparatus according to claim 1, wherein if the type of the first job is not a copy job, the control unit causes the printing unit to execute the second printing process.

4. The printing apparatus according to claim 1, further comprising a conveying path for double-sided printing, wherein if the printing unit executes the second printing process, after the printing unit has printed the first image on the first side of the sheet by executing the first job, the printing unit conveys the sheet to the conveying path for double-sided printing, and while the sheet is existing on the conveying path for double-sided printing, the printing unit prints the second image on the second sheet of the second job.

5. A control method for a printing apparatus, the method comprising:

executing a first printing process in which, after a first image has been printed on a first side of a sheet and a second image has been printed on a second side of the sheet by executing a first job, a third image is printed on another sheet by executing a second job to be executed following the first job, and a second printing process in which, after the first image has been printed on the first side of the sheet by executing the first job and before the second image is printed on the second side of the sheet by executing the first job, the third image is printed on the another sheet by executing the second job to be executed following the first job; and deciding, based on a type of the first job, whether the first printing process is to be executed or the second printing process is to be executed.

6. A non-transitory computer readable storage medium storing a program for causing a computer to execute the control method for controlling a printing apparatus, the program comprising:

a code to execute a first printing process in which, after a first image has been printed on a first side of a sheet and a second image has been printed on a second side of the sheet by executing a first job, a third image is printed on another sheet by executing a second job to be executed following the first job, and a second printing process in which, after the first image has been printed on the first side of the sheet by executing the first job and before the second image is printed on the second side of the sheet by executing the first job, the third image is printed on the another sheet by executing the second job to be executed following the first job; and a code to decide, based on a type of the first job, whether the first printing process is to be executed or the second printing process is to be executed.

\* \* \* \* \*